United States Patent
Ka

(10) Patent No.: US 10,083,042 B2
(45) Date of Patent: Sep. 25, 2018

(54) MOBILE TERMINAL AND CONTROL METHOD THEREOF

(71) Applicant: LG ELECTRONICS INC., Seoul (KR)

(72) Inventor: Hokyung Ka, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 927 days.

(21) Appl. No.: 13/948,726

(22) Filed: Jul. 23, 2013

(65) Prior Publication Data

US 2014/0032880 A1    Jan. 30, 2014

Related U.S. Application Data

(60) Provisional application No. 61/676,030, filed on Jul. 26, 2012.

(30) Foreign Application Priority Data

May 22, 2013   (KR) .................. 10-2013-0057748

(51) Int. Cl.
  *G01F 1/32*   (2006.01)
  *G06F 9/38*   (2018.01)
  *G06F 1/32*   (2006.01)

(52) U.S. Cl.
  CPC ............ *G06F 9/3885* (2013.01); *G06F 1/325* (2013.01); *G06F 1/3206* (2013.01); *G06F 1/3293* (2013.01); *G06F 2200/1637* (2013.01); *Y02D 10/122* (2018.01)

(58) Field of Classification Search
  CPC .................................................. H04M 1/0235

USPC ................ 702/56, 104, 141, 181, 183, 188; 224/271; 362/602; 455/418
  See application file for complete search history.

(56) References Cited

U.S. PATENT DOCUMENTS

| | | | |
|---|---|---|---|
| 7,191,281 B2 | 3/2007 | Bajikar | |
| 2003/0163287 A1* | 8/2003 | Vock | A43B 3/0005 702/187 |
| 2010/0181988 A1 | 7/2010 | Hong et al. | |
| 2010/0216447 A1* | 8/2010 | Park | H04M 1/0235 455/418 |
| 2010/0313050 A1 | 12/2010 | Harrat et al. | |

(Continued)

FOREIGN PATENT DOCUMENTS

| | | |
|---|---|---|
| KR | 10-2010-0086141 A | 7/2010 |
| KR | 10-2012-0014233 A | 2/2012 |

*Primary Examiner* — Elias Desta
(74) *Attorney, Agent, or Firm* — Birch, Stewart, Kolasch & Birch, LLP

(57) ABSTRACT

A mobile terminal and a method for controlling the mobile terminal are disclosed. A mobile terminal according to one embodiment of the present invention comprises at least one sensor; a first processor for controlling operation of the at least one sensor; a second processor for controlling an application; and a vibration unit detecting a force applied by the user, where the vibration unit is woken up when a force applied by the user exceeds a predetermined magnitude while the at least one sensor, the first processor, the second processor, and the vibration unit are all in a sleep state; and if the first processor is woken up by the vibration unit, the first processor wakes up the second processor based on sensing data collected by the at least one sensor.

11 Claims, 6 Drawing Sheets

(56) References Cited

U.S. PATENT DOCUMENTS

| | | | |
|---|---|---|---|
| 2011/0098019 A1* | 4/2011 | Fujii | H04M 1/576 455/411 |
| 2011/0204108 A1* | 8/2011 | Manley | A45F 5/02 224/271 |
| 2012/0062455 A1 | 3/2012 | Panabaker et al. | |
| 2012/0096290 A1 | 4/2012 | Shkolnikov et al. | |
| 2013/0265800 A1* | 10/2013 | Hong | H04M 1/22 362/602 |

\* cited by examiner

MOBILE TERMINAL AND CONTROL METHOD THEREOF

CROSS-REFERENCE TO RELATED APPLICATIONS

Pursuant to 35 U.S.C. § 119(a) and 35 U.S.C § 119(e), this application claims the benefit of earlier filing date and right of priority to Korea Patent Application No. 10-2013-0057748, filed on May 22, 2013, and U.S. Application No. 61/676,030, filed on Jul. 26, 2012 respectively, the contents of which are incorporated by reference herein in their entirety.

BACKGROUND

Field

The present invention relates to a mobile terminal and a method for controlling the mobile terminal. More particularly, the present invention relates to a low-power mobile terminal capable of obtaining context awareness information and a method for controlling the mobile terminal.

Related Art

A mobile terminal such as a portable media player, a cellular phone, and so on includes at least one sensor intended for detecting characteristics of the mobile terminal and its surroundings. For example, the mobile terminal can include at least one or more motion detection sensors such as an accelerometer or gyroscope detecting orientation and/or motion of the mobile terminal.

Meanwhile, mobile terminals exhibiting excellent context awareness capability are now available in the market, which obtain context information of a user using the mobile terminal from various sensors installed in the mobile terminal and provide the user with information desired by the user in a form preferred by the user through the mobile terminal.

Therefore, there is a growing need for power management of the mobile terminal for obtaining various kinds of context information.

SUMMARY

A mobile terminal according to one aspect of the present invention comprises at least one sensor; a first processor for controlling operation of the at least one sensor; a second processor for controlling an application; and a vibration unit detecting a force applied by the user, where the vibration unit is woken up when a force applied by the user exceeds a predetermined magnitude while the at least one sensor, the first processor, the second processor, and the vibration unit are all in a sleep state; and if the first processor is woken up by the vibration unit, the first processor wakes up the second processor based on sensing data collected by the at least one sensor.

The second processor can execute at least one application corresponding to the collected sensing data from among at least one application.

The at least one sensor can include at least one of an accelerometer, gyro sensor, piezoelectric sensor, position sensor, temperature sensor, and humidity sensor.

The first processor can adjust a sampling period at which the at least one sensor obtains sensing data according to the magnitude of a force applied by the user.

The vibration unit can classify the user's state according to the magnitude of a force applied by the user into a grip state in which the user grips the mobile terminal, a walking state in which the user walks while gripping the mobile terminal, and a running state in which the user runs while gripping the mobile terminal.

The first processor can analyze the collected sensing data and wake up the second processor when context information of the user is recognized based on the collected sensing data.

Meanwhile, if it is determined that context information of the user cannot be recognized from the collected sensing data, the first processor keeps the second processor in the sleep state and continues collecting sensing data.

The first processor can activate at least part of sensors from among the at least one sensor based on a vibration pattern detected by the vibration unit.

The application can correspond to a motion detection application.

In case the user's force detected by the vibration unit is less than a predetermined magnitude, the vibration unit can enter the sleep state.

A method for controlling a mobile terminal according to another aspect of the present invention comprises detecting a force applied by the user through a vibration unit while at least one sensor, a first processor for controlling operation of the at least one sensor, a second processor for controlling an application, and the vibration unit detecting the force applied by the user are all in a sleep state; waking up the vibration unit when the detected force exceeds a predetermined magnitude; waking up a first processor for controlling operation of at least one sensor through the vibration unit; waking up at least one sensor through the first processor; collecting sensing data through the at least one sensor woken up; and waking up the second processor through the first processor.

A method for controlling a mobile terminal according to an embodiment of the present invention described above can be implemented by carrying out a computer program for realizing the method for controlling a mobile terminal stored in a computer-readable recording medium.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
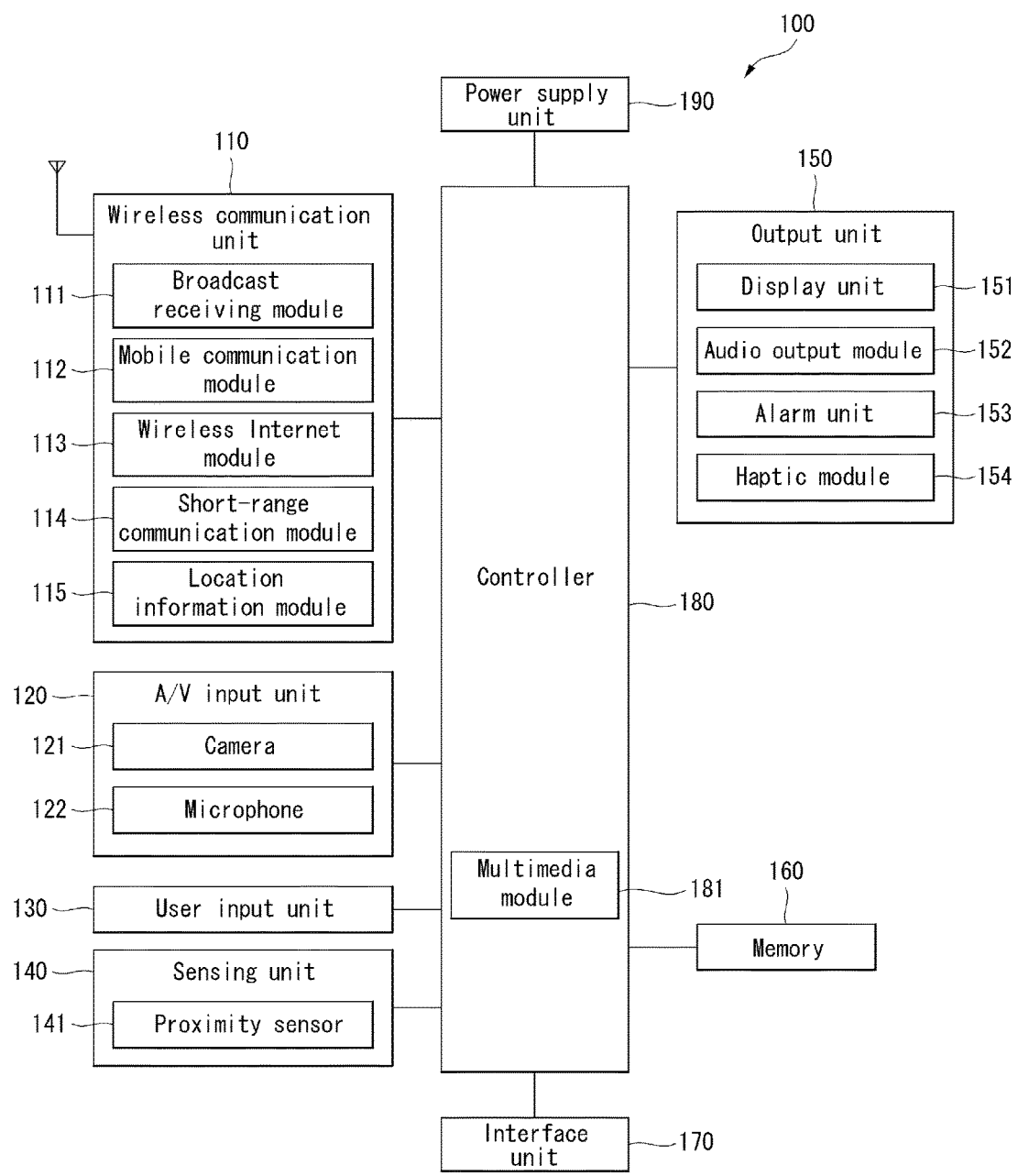
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile, communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may, also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
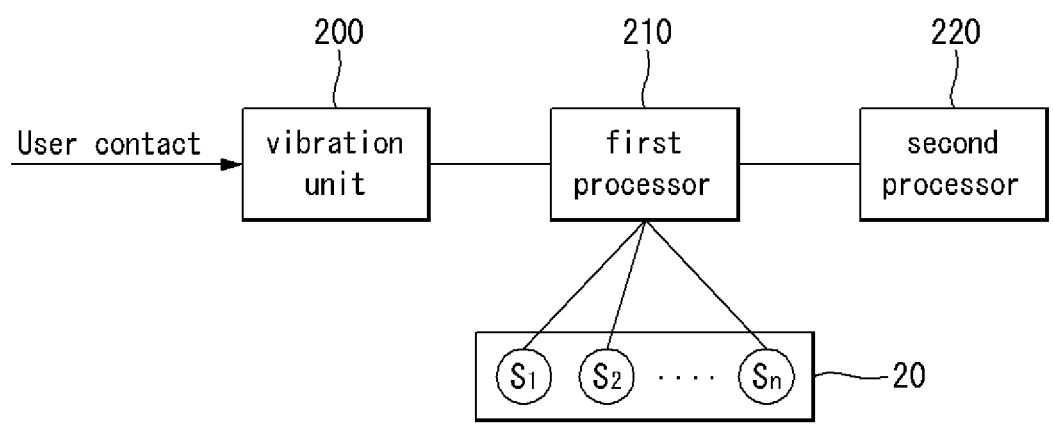
FIG. 2 is an actual block diagram for implementing a method for controlling a mobile terminal according to one embodiment of the present invention.

FIG. 2 is an actual block diagram for implementing a method for controlling a mobile terminal according to one embodiment of the present invention. The mobile terminal 100 according to one embodiment of the present invention can be implemented in the mobile terminal 100 described with reference to FIG. 1. Now, implementation of a specific embodiment of the present invention is described with reference to FIG. 2. With reference to FIG. 2, the mobile terminal 100 according to one embodiment of the present invention can further comprise a vibration unit 200, a first processor 210, and a second processor 220 in addition to the components described in FIG. 1.

The vibration unit 200, being a mechanical vibration device, can detect a force applied to the mobile terminal 100 by the user.

If the user grips the mobile terminal 100, the vibration unit 200 can detect the user's grip on the mobile terminal 100. At this time, the vibration unit 200 can include a motion sensor detecting motion of the mobile terminal 100.

For example, the motion sensor can include an orientation or vibration element.

The motion sensor can include at least one or more three-axis acceleration motion sensors (for example, accelerometers) operating to detect linear acceleration along three directions (namely, x or left/right direction, y or upward/downward direction, and z or forward/backward direction). Similarly, the motion sensor can include at least one or more single axis or two-axis acceleration motion sensors operating to detect linear acceleration along each of x or left/right direction and y or upward/downward direction. Also, the motion sensor can include a heat-based MEMS type accelerometer, a piezoelectric type accelerometer, and a piezoresistance type accelerometer.

The motion sensor can operate to detect rotation, rotational motion, angular displacement, inclination, position, orientation, motion along a non-linear path (for example, a path in the shape of an arch), and so on directly. For example, in case the motion sensor is such kind of a sensor detecting a linear motion, additional processing may be required to detect part or the whole of a nonlinear motion indirectly. Also, by comparing a linear output of the motion sensor with a gravity vector, the motion sensor can calculate a tilt angle of the mobile terminal 100 against the y-axis. In addition, the motion sensor can include at least one gyroscope for detecting an optimal motion.

In case a force of a first magnitude (for example, 50 mG) is detected through the vibration unit 200, the vibration unit 200 in a sleep state can enter an active state.

At this time, the vibration unit 200 can detect a force applied by the user even before it is woken up. In other words, the vibration unit 200 can detect the motion or grip state of the mobile terminal 100 since minute electric currents flow while the vibration unit 200 is in the sleep state. The amount of minute currents flowing through the vibration unit 200 in the sleep state amounts to approximately 0.2 μA to 2 mA.

On the other hand, operating currents required for operating conventional sensors amount to about 130 mA, which is a relatively large consumption of currents considering the amount of currents required for operating the vibration unit 200.

Meanwhile, the vibration unit 200, the first processor 210, and the second processor 220 all stay in the sleep state before a force applied by the user is detected through the vibration unit 200.

Meanwhile, if the vibration unit 200 is activated, the vibration unit 200 can wake up the first processor 210. At this time, the first processor 210 performs the role of a hub for managing operation of at least one sensor 20 $S_1$, $S_2$, ..., $S_n$ to obtain context awareness information.

The first processor 210, too, requires a predetermined amount of currents for managing operation of the at least one sensor and the at least one sensor $S_1$, $S_2$, ..., $S_n$ managed by the first processor 210 also requires a predetermined amount of currents to collect sensing data.

If the first processor 210 is woken up by the vibration unit 200, the first processor 210 wakes up at least one sensor 20 $S_1$, $S_2$, ..., $S_n$ and collects sensing data through the woken-up at least one sensor. Context awareness information can be obtained through the sensing data.

On the other hand, the second processor 220 may correspond to an application processor AP for controlling an application. The second processor 220 can be woken up by the first processor 210.

If the second processor 220 is woken up, at least one application can be carried out according to the context recognized based on the collected sensing data. Also, the second processor 220 can carry out a user interface corresponding to the recognized context.

Meanwhile, as described above, the vibration unit 200 can be implemented by various embodiments of motion sensors and accordingly, the vibration unit 200 according to one embodiment of the present invention can recognize the force applied by the user derived from subdivided magnitudes.

For example, in case the magnitude of a force applied by the user through the vibration unit 200 is 50 mG, the vibration unit 200 can change its state from a sleep state to a wake-up state. Also, in case the magnitude and/or pattern of a force applied by the user changes while the vibration unit 200 is woken up, use of an application corresponding to the magnitude and/or pattern of the force can be proposed.

In other words, according to one embodiment of the present invention, the vibration unit 200 can perform the role of actually controlling operation of a sensor and application processor in the sleep state.

In what follows, a specific example where the vibration unit 200 controls the operation of the first 210 and the second processor 220 will be described with reference to related drawings.

Figure 3:
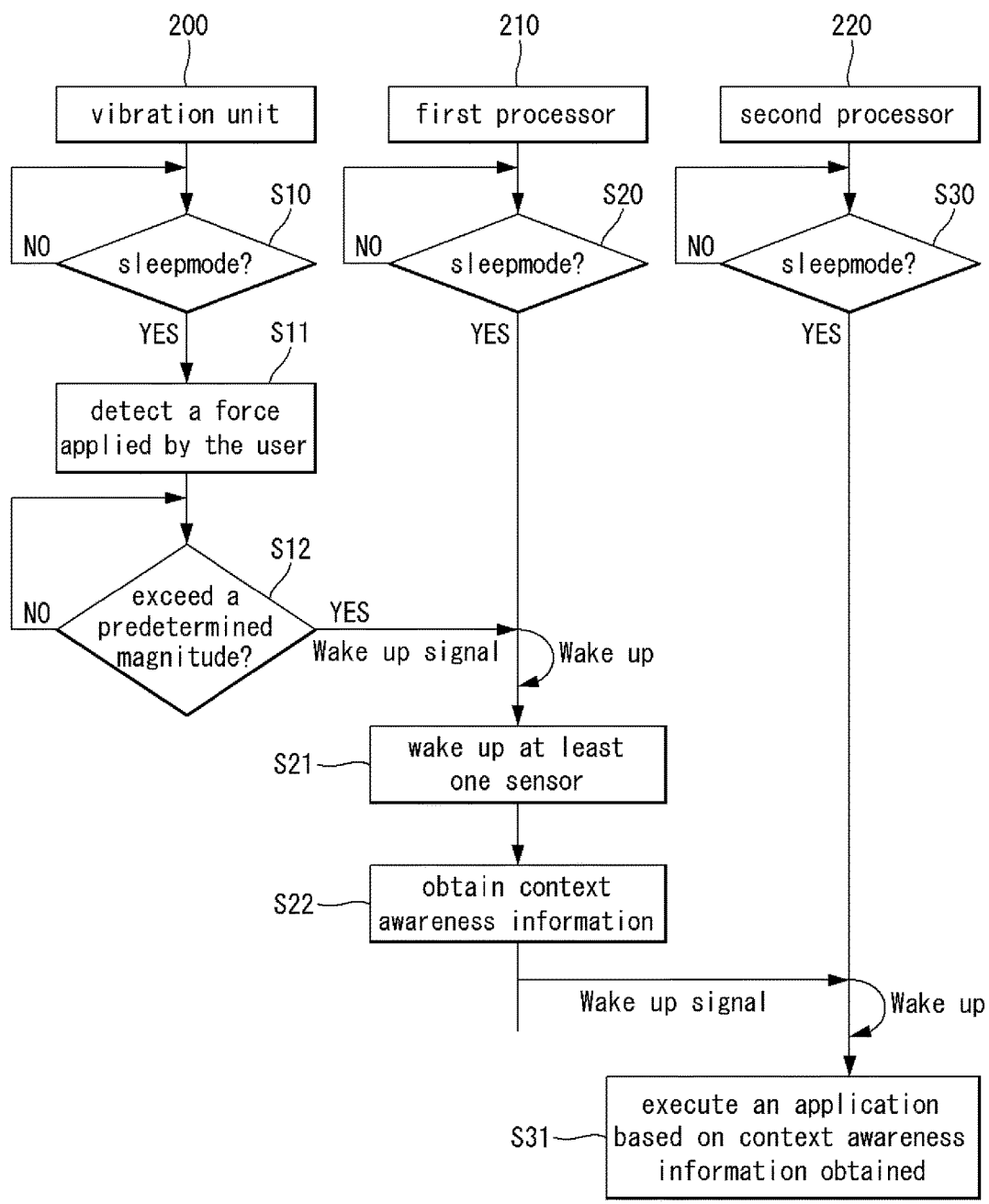
FIG. 3 is a flow diagram of a method for controlling a mobile terminal according to one embodiment of the present invention.

FIG. 3 is a flow diagram of a method for controlling a mobile terminal according to one embodiment of the present invention. A method for controlling a mobile terminal according to an embodiment of FIG. 3 can be realized in the mobile terminal 100 described with reference to FIGS. 1 and 2. In what follows, a method for controlling a mobile terminal according to one embodiment of the present invention and operation of the mobile terminal 100 for implementing the method will be described in detail with reference to related drawings.

The vibration unit 200, the first processor 210, and the second processor 220 illustrated in FIG. 2 may correspond to constituting elements included in the mobile terminal 100 of FIG. 1 for implementing embodiments of the present invention or a combination of devices installed separately from the mobile device 100.

With reference to FIG. 3, the vibration unit 200, the first processor 210, and the second processor 220 can all stay in the sleep mode S10, S20, S30.

Accordingly, the vibration unit 200, the first processor 210, and the second processor 220 can be made to operate in such a way to consume the minimum standby power in the sleep state. Here, the standby power refers to the power consumed by a device in the sleep state, varying according to the type of the device.

For example, standby power of the vibration unit 200 may amount approximately to 0.2 μA~2 mA as described above. The first 210 and the second processor 220 may require operating currents only in the active state to operate the mobile terminal without consuming separate standby power. In other words, standby power required by the first 210 and the second processor 220 can be zero.

The vibration unit 200 detects a force applied by the user S11.

In case a user force more than a predetermined magnitude, for example, 50 mG, is detected S11, the vibration unit 200 can be woken up from the sleep state S13.

The vibration unit 200, as soon as it is woken up, delivers a signal for waking up the first processor 210 to the first processor 210.

The first processor 210 can be woken up as the signal is received and wake up at least one sensor S21.

In other words, the first processor for controlling operation of the at least one sensor can operate separately from the at least one sensor.

The first processor 210 can wake up at least one of the at least one or more sensors.

The first processor 210 can wake up at least one sensor in response to the magnitude and/or pattern of a force detected through the vibration unit 200.

Also, the first processor 210 can adjust the sampling period of the at least one sensor according to the magnitude and/or pattern of a force detected through the vibration unit 200.

Afterwards, the first processor 210 can obtain sensing data through a woken-up sensor. The first processor 210 can obtain sensing data through a sensor woken up according to a predetermined sampling period.

The first processor 210 can generate context awareness information by analyzing the sensing data.

For example, the magnitude and/or pattern of a force applied by the user detected through the vibration unit 200 can be classified into 1) a grip state where the user grips the mobile terminal 100, 2) a walking state where the user walks while gripping the mobile terminal 100, and 3) a running state where the user runs while gripping the mobile terminal 100.

In case the vibration unit 200 detects a force with a predetermined magnitude as the user grips the mobile terminal 100, the vibration unit 200 is woken up and subsequently wakes up the first processor 210. The first processor 210 wakes up at least one sensor and collects sensing data at a first sampling period corresponding to the grip state where the user grips the mobile terminal 100.

In the walking state where the user walks while gripping the mobile terminal 100, the vibration unit 200 is woken up and wakes up the first processor 210. The first processor 210 wakes up at least one sensor and collects sensing data at a second sampling period corresponding to the walking state. Here, the second sampling period can be configured to be shorter than the first sampling period.

The vibration unit 200 can operate in the same way as the two situations described above in the running state where the user runs while gripping the mobile terminal 100. A third sampling period corresponding to the running state can be configured to be shorter than the aforementioned first and second sampling period.

Although the previous examples divide the magnitude and/or pattern of a force applied to the vibration unit 200 into the gripping, walking, and running state, the technical scope of the present invention is not limited to the description above but various modifications thereof can be embodied.

For example, the mobile terminal 100 can detect motion shaking the mobile terminal 100 continuously in a left and right direction while the user grips the mobile terminal 100. This case corresponds to neither the walking state nor the running state; however, an actual sampling period of a sensor may have to be configured to be shorter than that of a simple grip state.

Also, in case the magnitude and/or pattern of a force applied by the user detected through the vibration unit 200 is different from a predetermined magnitude and/or pattern, the mobile terminal 100 according to one embodiment of the present invention can provide the touch screen 151 with a user interface that allows the user to configure a sampling period directly.

As described above, the vibration unit 200 can wake up the first processor in the sleep state and obtain sensing data as the first processor wakes up sensors. In other words, it is not necessary to keep the sensors for collecting context awareness information in the wake-up state all the time; instead, it is enough for the sensors to be kept in the wake-up state only for the time period during which the sensors are woken up by the vibration unit. Therefore, currents consumed for operating the sensors can be saved and from the standpoint of the mobile terminal 100, context awareness information can be obtained with low-power consumption.

Meanwhile, when obtaining context awareness information, the first processor 210 can deliver a signal for waking up the second processor 220 to the second processor 220. The second processor 220 can include an application processor AP for controlling applications. In what follows, the second processor denotes an application processor.

The first processor 210 wakes up the second processor 220.

The second processor 220 can carry out a predetermined application based on the context awareness information obtained by the first processor 210, S31.

The context awareness information obtained by the first processor 210 can be delivered to the second processor; the second processor 220 can display on the touch screen 151 an application corresponding to the delivered context awareness information, a user interface to carry out the application, and so on.

Figure 4:
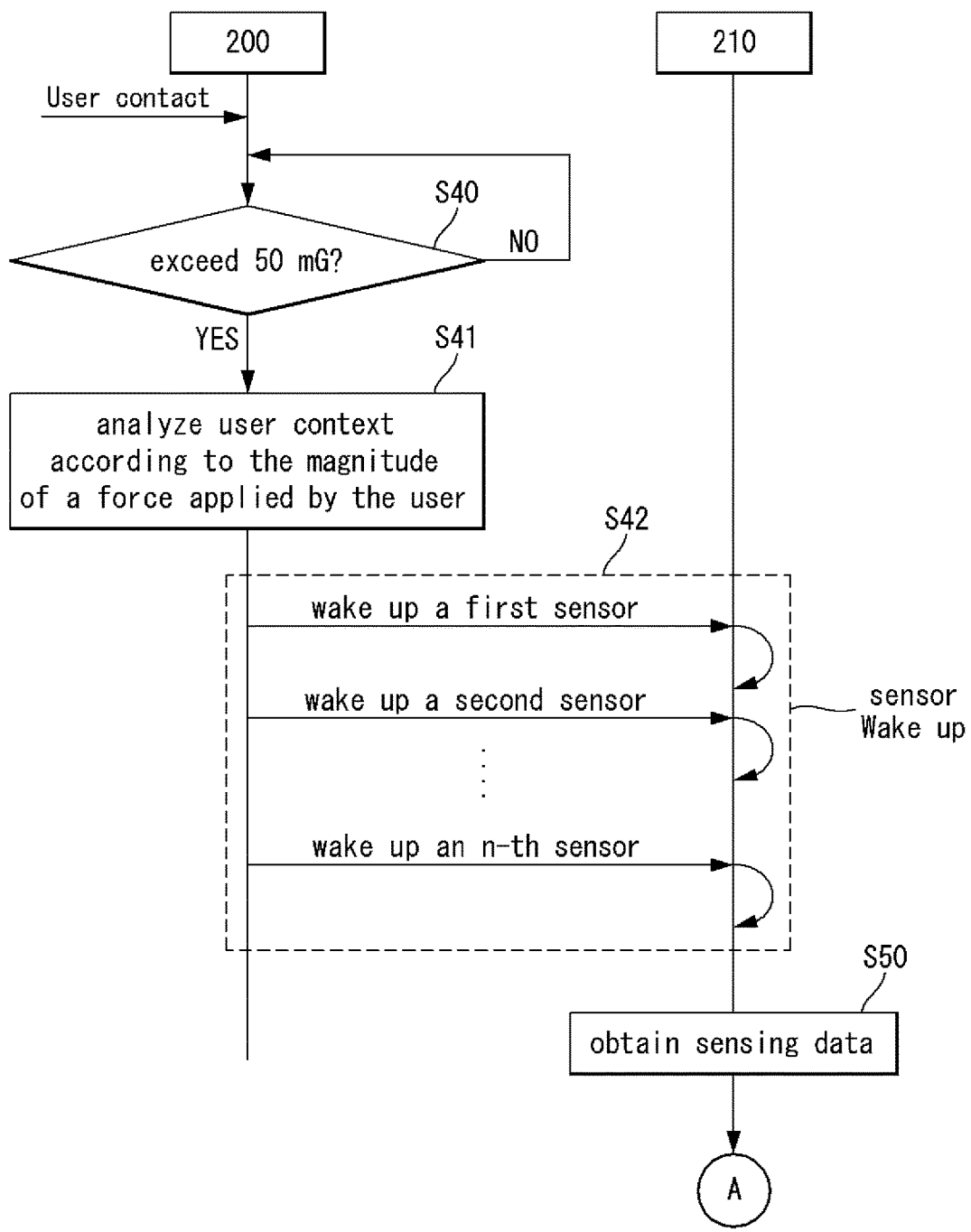
FIG. 4 is a flow diagram for illustrating an example of waking up at least one sensor selectively according to the magnitude of a force applied to a vibration unit according to a method for controlling a mobile terminal according to one embodiment of the present invention.

FIG. 4 is a flow diagram for illustrating an example of waking up at least one sensor selectively according to the magnitude of a force applied to a vibration unit according to a method for controlling a mobile terminal according to one embodiment of the present invention.

With reference to FIG. 4, the vibration unit 200 detects a force applied by the user while the vibration unit 200, first processor 210, and application processor 220 are all in the sleep state.

If the magnitude of a force detected exceeds a predetermined magnitude (for example, 50 mG), the vibration unit 200 is woken up and analyzes the context of the user according to the magnitude of the force applied by the user S41.

Here, the vibration unit 200 woken up can wake up sensors selectively according to the user context based on a mechanical vibration pattern.

For example, the vibration unit 200 can control the operation of sensors in such a way that at least one of a first and second to n-th sensor managed by the first processor 210 can be woken up selectively S42.

For example, in case it is determined from an analysis of a force applied by the user detected through the vibration unit 200 that the user is gripping the mobile terminal 100, the vibration unit 200 can wake up at least one sensor that can be utilized while the user is gripping the mobile terminal 100.

For example, in case the user simply grips the mobile terminal 100, immediate motion from the mobile terminal 100 is not detected. Therefore, those sensors such as accelerometers intended for detecting motion of the mobile terminal 100 do not have to be woken up.

Also, for example, in case it is determined from an analysis of a force applied by the user detected through the vibration unit 200 that the user moves around while gripping the mobile terminal 100, the vibration unit 200 can wake up the accelerometer and the like intended for detecting motion of the mobile terminal 100. And the mobile terminal 100 can obtain sensing data through the sensors woken up S50.

In other words, it is true that the vibration unit 200 wakes up the first processor 210 for managing operation of at least one sensor; however, the first processor 210 selectively wakes up sensors that can recognize the current context of the user more accurately based on the magnitude and/or pattern of a force analyzed by the vibration unit 200 rather than wake up all the sensors managed by the first processor 210. Due to this operation, the right amount of power is supplied to sensors in need of power and context awareness information can be obtained with low power consumption.

Figure 5:
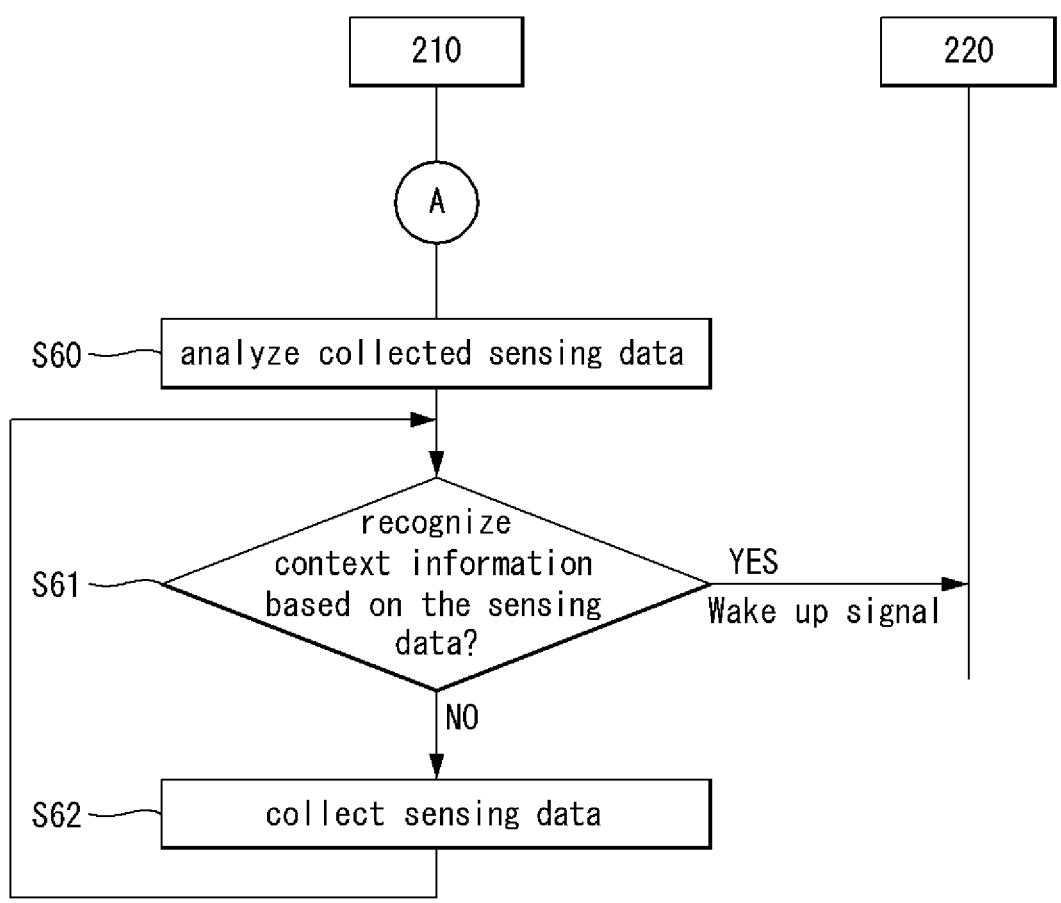
FIG. 5 is a flow diagram for illustrating an example of waking up a second processor (for example, an application processor) in the embodiment of FIG. 3.

FIG. 5 is a flow diagram for illustrating an example of waking up a second processor (for example, an application processor) in the embodiment of FIG. 3.

With reference to FIG. 5, if a predetermined sensor is woken up and sensing data are collected after the first processor 210 is woken up, the first processor 210 analyzes the sensing data collected S60.

The sensing data can be collected while the first processor 210 and the sensor are kept in the wake-up state. Although context awareness information can be obtained from the collected sensing data, there can be a chance that the amount of sensing data collected is insufficient or context awareness information is not obtained through the collected sensing data S61. In this case, the first processor 210 can continue to collect sensing data through the sensor S62.

Meanwhile, in case the first processor 210 obtains context awareness information based on the collected sensing data, it can deliver a wake-up signal to the second processor 220 and wake up the second processor 220. If the second processor 220 is woken up, execution of an application can be controlled.

According to the mobile terminal 100 according to one embodiment of the present invention, the vibration unit 200 wakes up the first processor 210 and the first processor 210 wakes up a sensor; thus, even if sensing data are collected, the second processor 220 (application processor) is woken up only when meaningful sensing data are obtained, thereby reducing unnecessary power consumption.

Figure 6:
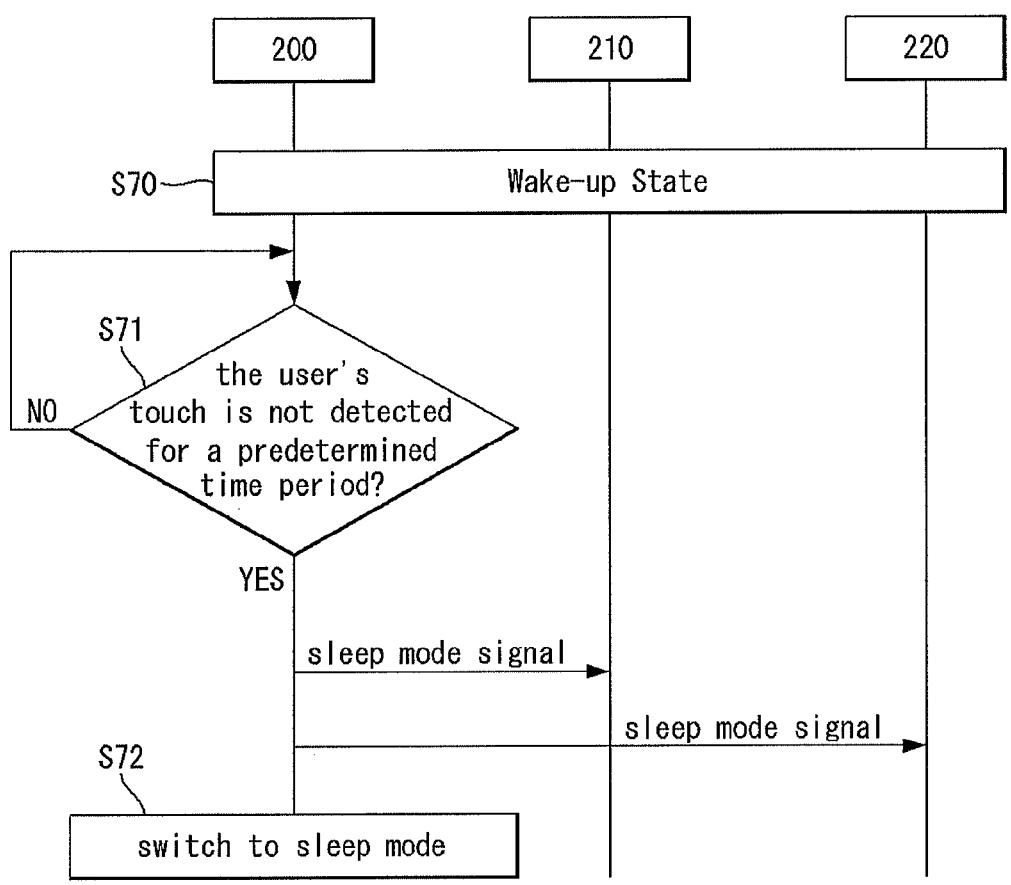
FIG. 6 is a flow diagram for illustrating an example of a processor saving power consumption through a vibration unit after collection of context awareness information is completed.

FIG. 6 is a flow diagram for illustrating an example of a processor saving power consumption through a vibration unit after collection of context awareness information is completed. With reference to FIG. 6, in case the user's touch is not detected through the vibration unit 200 for a predetermined time period while the vibration unit 200, first processor 210, and second processor 220 are all in the wake up state S71: YES, the vibration unit 200 can deliver signals respectively for switching the first processor 210 and the second processor 220 into the sleep state.

Then the vibration unit 200 also enters the sleep state S72.

Due to this operation, if it is determined that further collection of context awareness information is not carried out in the wake-up state, the mobile terminal 100 according to one embodiment of the present invention can control the operation such that the vibration unit 200, the first processor 210 and the second processor 220 all fall into the sleep state.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a plurality of sensors configured to detect a status of the mobile terminal;
a first processor configured to control operation of the plurality of sensors;
a second processor configured to control at least one application; and
a vibration unit configured to:
detect a vibration pattern and a force applied to the mobile terminal by a user while the plurality of sensors, the first processor, the second processor, and the vibration unit are all in a sleep state,
change the sleep state of the vibration unit to a wake up state when the force applied by the user exceeds a predetermined magnitude, and
output a signal for waking up the first processor to the first processor,
wherein the first processor is woken up by the vibration unit, selects at least one sensor corresponding to the detected vibration pattern and force from among the plurality of sensors, wakes up the selected at least one sensor, and outputs a signal for waking up the second processor only when sensing data collected by the selected at least one sensor corresponds to predetermined context information, wherein the second processor executes an application corresponding the predetermined context information.

2. The mobile terminal of claim 1, wherein the plurality of sensors include at least one of an accelerometer, gyro sensor, piezoelectric sensor, position sensor, temperature sensor, and humidity sensor.

3. The mobile terminal of claim 1, wherein the first processor adjusts a sampling period at which the at least one sensor obtains sensing data according to the magnitude of a force applied by the user.

4. The mobile terminal of claim 3, wherein the vibration unit classifies a state of the user according to the magnitude of the force applied by the user into a grip state in which the user grips the mobile terminal, a walking state in which the user walks while gripping the mobile terminal, and a running state in which the user runs while gripping the mobile terminal.

5. The mobile terminal of claim 1, wherein the first processor analyzes the collected sensing data and wakes up the second processor when the context information of the user is recognized based on the collected sensing data.

6. The mobile terminal of claim 1, wherein the application corresponds to a motion detection application.

7. The mobile terminal of claim 1, wherein the vibration unit enters the sleep state when the force applied by the user and detected by the vibration unit is less than a predetermined magnitude.

8. A method for controlling a mobile terminal, the method comprising:
   detecting a vibration pattern and a force applied to the mobile terminal by a user through a vibration unit while a plurality of sensors, a first processor for controlling operation of the plurality of sensors, a second processor for controlling at least one application, and the vibration unit detecting the force applied by the user are all in a sleep state, wherein the plurality of sensors are for detecting a status of the mobile terminal;
   changing the sleep state of the vibration unit to a wake up state when the detected force exceeds a predetermined magnitude, wherein the vibration unit outputs a signal for waking up the first processor to the first processor;
   waking up a first processor for controlling operation of at least one sensor through the vibration unit, wherein the first processor is woken up by the vibration unit and selects at least one sensor corresponding to the detected vibration pattern and force from among the plurality of sensors;
   waking up the selected at least one sensor through the first processor;
   collecting sensing data through the selected at least one sensor woken up;
   waking up, through the first processor, the second processor only when the sensing data collected by the at selected at least one sensor corresponds to predetermined context information; and
   executing, through the second processor, an application corresponding to the predetermined context information.

9. The method of claim 8, wherein the collecting the sensing data adjusts a sampling period at which sensing data are obtained from the at least one sensor according to the magnitude of the force applied by the user.

10. The method of claim 8, wherein the waking up the second processor comprises:
    analyzing the collected sensing data;
    recognizing context information of the user based on the collected sensing data; and
    waking up the second processor when the context information of the user is recognized.

11. The method of claim 8, wherein the vibration unit enters a sleep state when the force applied by the user and detected by the vibration unit is less than a predetermined magnitude while the vibration unit is activated.

* * * * *